(12) United States Patent
Wallace et al.

(10) Patent No.: US 7,740,130 B2
(45) Date of Patent: Jun. 22, 2010

(54) DIGITAL PROCESSOR SENSOR LOOP DETECTOR AND METHOD

(75) Inventors: Jack Bruce Wallace, Powell, OH (US); John James Gartland, Delaware, OH (US); Richard Herman Blausey, Toledo, OH (US); Edward Louis Kerekes, Jr., Oregon, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 1024 days.

(21) Appl. No.: 11/421,224

(22) Filed: May 31, 2006

(65) Prior Publication Data

US 2007/0278068 A1 Dec. 6, 2007

(51) Int. Cl.
G08B 21/00 (2006.01)

(52) U.S. Cl. .................. 198/810.02; 198/502.1
(58) Field of Classification Search ............ 198/810.02, 198/502.1; 340/679
See application file for complete search history.

(56) References Cited

U.S. PATENT DOCUMENTS

| | | | |
|---|---|---|---|
| 3,731,113 A | 5/1973 | Lowe et al. | |
| 3,742,477 A | 6/1973 | Enabnit | |
| 3,831,161 A | 8/1974 | Enabnit | |
| 3,922,661 A | 11/1975 | Enabnit et al. | |
| 4,017,826 A | 4/1977 | Enabnit | |
| 4,228,513 A | 10/1980 | Doljack | |
| 4,229,735 A | 10/1980 | Houck | |
| 4,349,883 A | 9/1982 | Doljack | |
| 4,436,198 A | 3/1984 | Houck et al. | |
| 4,437,536 A * | 3/1984 | Colanzi et al. | 180/254 |
| 4,447,807 A | 5/1984 | Klein et al. | |
| 4,463,434 A | 7/1984 | Haylett et al. | |
| 4,464,654 A | 8/1984 | Klein | |
| 4,470,120 A | 9/1984 | Haylett | |
| 4,541,063 A | 9/1985 | Doljack | |
| 4,621,727 A | 11/1986 | Strader | |
| 4,646,912 A | 3/1987 | Houck et al. | |
| 4,854,446 A | 8/1989 | Strader | |
| 5,168,266 A | 12/1992 | Fukuda | |
| 5,181,975 A | 1/1993 | Pollack et al. | |
| 6,032,787 A | 3/2000 | Kellis | |
| 6,047,814 A | 4/2000 | Alles et al. | |
| 6,264,577 B1 | 7/2001 | Hutchins | |
| 6,352,149 B1 | 3/2002 | Gartland | |
| 6,356,201 B1 | 3/2002 | Alles | |
| 6,581,755 B1 | 6/2003 | Wilke et al. | |
| 6,712,199 B1 | 3/2004 | Bruckner et al. | |
| 6,715,602 B1 | 4/2004 | Gartland | |
| 6,781,515 B2 * | 8/2004 | Kuzik et al. | 340/676 |
| 6,831,566 B1 | 12/2004 | Kusel | |
| 2002/0145529 A1 | 10/2002 | Kuzik et al. | |
| 2004/0149049 A1 | 8/2004 | Kuzik et al. | |
| 2004/0262132 A1 | 12/2004 | Pauley et al. | |

* cited by examiner

Primary Examiner—Mark A Deuble
(74) Attorney, Agent, or Firm—Alvin T. Rockhill; Kathleen Bowen

(57) ABSTRACT

A digital processor for use in a conveyor belt rip detector, which provides excitation signals at a selected frequency to inverted and noninverted sensor loops on a conveyor belt and then, detects corresponding received signals from the sensor loops. The digital processor then performs FFTs on the corresponding received signals to provide respective received signal frequency spectrums. Next magnitude and phase values of the selected frequency in the respective received signal frequency spectrums are used to determine a qualitative state of the sensor loops. The selected frequency has a lowest detected ambient noise level, and the magnitude value is a normalized magnitude value.

23 Claims, 3 Drawing Sheets

DIGITAL PROCESSOR SENSOR LOOP DETECTOR AND METHOD

FIELD OF THE INVENTION

This invention relates generally to conveyor belts and, more particularly, to an improved system for detecting damage or rips to conveyor belts.

BACKGROUND OF THE INVENTION

In a multitude of commercial applications, it is common to employ a heavy duty conveyor belt for the purpose of transporting product and material. The belts so employed may be relatively long, on the order of miles, and represent a high cost component of an industrial material handling operation. In many applications, the belts are susceptible to damage from the material transported thereby, and a rip (slit, cut or tear) may develop within the belt. A torn or ripped belt can be repaired once detected. The cost of repairing a heavy duty conveyor belt and the cost of cleaning up material spilled from the damaged belt can be substantial. If, however, such a rip or tear commences and the belt is not immediately stopped, the rip can propagate for a substantial distance along the belt. It is, therefore, desirable to detect and locate a rip in the belt as quickly as possible after it commences and to immediately terminate belt operation, whereby minimizing the extent of the damage to the belt.

It is well known to employ sensors within conveyor belts as part of a rip detection system. In a typical system, sensors in the form of loops of conductive wire are affixed or embedded in the belt and provide a rip detection utility as part of an overall rip detection system. Rip detection is achieved through the inferential detection of an "open circuit" condition in one or more of the sensor loops in the belt. Typically, an electrical energy source external to the belt is inductively coupled to a sensor loop in the belt. A break in the conductive wire loop of the sensor may be detected by a remote transmitter/receiver (exciter/detector). Disposition of a plurality of such sensors at intervals along the conveyor may be effected with each sensor passing within read range of one or more exciter/detectors at various locations. A rip or tear will encounter and damage a proximal sensor loop and the existence of the tear will be detected when the proximal sensor loop damage is detected as an open circuit by the reader at its next pass. In this manner, the existence of a tear will be promptly detected and repaired and damage to the belt is minimized.

While existing rip detection systems are known to operate reliably and well, there is a continuing effort to improve system performance. In that regard, several areas for potential improvement have been identified. First, in some operational environments, the electrical noise is so great that a poor signal-to-noise ratio significantly decreases the accuracy of the rip detector function. Moreover, it has been observed that with a conveyor belt carrying antennas intended for inductive coupling, much of the electrical noise introduced to the receiver is derived from capacitive cross-coupling. This is primarily of a capacitive nature, between the probes of the transmitter and receiver via the belt itself and/or apparatus associated therewith, such as the rollers, drive wheels, support frame, etc. The magnitude of the electrical noise signal in a conveyor belt rip detector often approaches the magnitude of the transmitter signal; and, therefore, it is quite difficult to sense a received transmitter signal with accuracy, especially in particularly electrically noisy environments in which conveyor belt rip detectors often are found.

Second, wear, stretching, contraction, dirt, other environmental conditions, etc. may cause a variation in the efficiency of signal coupling, whether of the capacitive, inductive, optical, or any other type of coupling, between the sensor loops (or other signal coupling means carried by the belt) and the transmitter and the receiver at a rip detector station. Such efficiency variation will vary the magnitude or other parameter of the input signal delivered from the receiver to the detector, which may detrimentally affect operation of the entire system. Hence, there is a need for a sensor loop detection system that is less sensitive to other environmental conditions as well as the distance between the detector and the conveyor belt.

Third, by monitoring the magnitude and phase of a signal received from a detected loop, a sensor loop detection system can be utilized to detect either inverted or noninverted sensor loop configurations. In some applications, a section of conveyor belt having one sensor loop configuration, for example, an inverted or figure eight configuration, is spliced with a section of conveyor belt having another configuration, for example, a noninverted loop configuration. In such an application, it is necessary that the sensor loop detection system be able to operate effectively with both sensor loop configurations simultaneously.

Fourth, many known systems use inductive coupling to excite the conductive sensor loops in the belt; and known automatic gain control circuits utilize a relatively large capacitance. Such a large capacitance requires electrical shielding and filtering and hence, is relatively costly. Thus, there is a need to develop a sensor drive system that does not require such a large capacitance and its associated electrical shielding and filtering.

SUMMARY OF THE INVENTION

The present invention provides a sensor loop detector that utilizes digital processing to create sensor loop excitation signals and to analyze corresponding feedback signals from the sensor loops. Further, the sensor loop detector of the present invention is capable of automatically selecting a frequency for the sensor loop excitation signal having a minimum noise amplitude, thereby making the system less sensitive to environmental noise. In addition, the digital processing of the sensor loop detector has a greater read range with respect to the sensor loops than prior analogue detection circuits, thereby further reducing sensitivity to changes in environmental variables. The sensor loop detector of the present invention applies fixed duration excitation signal pulse strings on an intermittent basis to further reduce adverse effects of capacitive cross-coupling and environmental noise. Also, the sensor loop detector does not use an automatic gain control circuit that requires a large capacitance, thereby eliminating the costly requirements of providing associated electrical shielding and filtering.

The sensor loop detector of the present invention is especially useful in those applications where there are high levels of capacitive cross-coupling and/or environmental noise. Further, the sensor loop detector is also useful in those applications where a conveyor belt has two different sensor loop configurations, for example, an inverted figure eight loop configuration and a noninverted loop configuration. In such an application, it is necessary that the sensor loop detector be able to operate effectively with both sensor loop configurations.

More specifically, in one embodiment, the invention provides a digital processor for use in a conveyor belt rip detector. The digital processor provides excitation signals at a selected frequency to sensor loops on a conveyor belt and then, detects corresponding received signals from the sensor loops. The digital processor then performs fast Fourier transforms on the corresponding received signals to provide respective received signal frequency spectrums. Next the digital processor determines a magnitude value and a phase value for the selected frequency in the respective received signal frequency spectrums and determines a qualitative state of the sensor loops in response to determining the magnitude and phase values.

In another embodiment of the invention, the digital processor provides successive periodic excitation signals for transmission to a sensor loop, the successive excitation signals have different frequencies to permit a detection of noise at all excitation frequencies. In one aspect of this invention, each successive excitation signal has a different frequency from an immediately preceding excitation signal; and therefore, ambient noise in all excitation signals can be detected with the application of only two excitation signals. In another aspect of this embodiment, the digital processor selects an excitation frequency having a lowest noise amplitude of all excitation frequencies.

In one aspect common to all embodiments of the invention, the digital processor provides excitation signals having a fixed duration, wherein the fixed duration terminates transmission of the excitation signal prior to determining the magnitude and phase values, thereby reducing an inherent capacitive cross-coupling that generates noise. In a further aspect of the invention, the excitation signal is a fixed duration pulse string.

In another aspect common to all embodiments of the invention, the magnitude value is a normalized magnitude value having a maximum value representing a signal magnitude that would be expected if the master and detector heads were in direct contact with the conveyor belt inside the sensor loop and a minimum value representing an absence of a sensor loop or the presence of a broken sensor loop.

In a still further aspect common to all embodiments of the invention, the sensor loops include inverted and noninverted sensor loops.

These and other objects and advantages of the present invention will become more readily apparent during the following detailed description taken in conjunction with the drawings herein.

DEFINITIONS

"Sensor loop" means an electrically conductive loop supported by the conveyor belt, which extends over a width of, or transversely across, the conveyor belt. The sensor loop functions as an antenna and conducts a current induced into the loop by a radio frequency "RF" field. A sensor loop can be made of one or more conductors and be configured as either an inverted loop or noninverted loop. An inverted loop is formed by flipping or inverting one end of a loop, thereby forming a figure eight shape. Numerous examples of sensor loops are known and may be used with this invention. A plurality of sensor loops are often spaced over a length of a conveyor belt and used to detect damage or a rip in the conveyor belt.

"Master head", "transmitter" or "exciter" means a circuit often containing an inductive element that is mounted in close proximity to a major surface of a conveyor belt and positioned off center to be generally adjacent to one end of a sensor loop. The master head radiates or transmits an RF signal toward one end of the sensor loop.

"Detector head" or "receiver" means a circuit often containing a inductive element that is mounted in close proximity to a major surface of a conveyor belt and positioned off center to be generally adjacent on opposite end of a sensor loop. The detector head receives an RF signal generated by a current induced into the sensor loop by an RF signal from the master head.

"Fast Fourier Transform" or "FFT" means an iterative, computer-executable algorithm to rapidly perform the Fourier transform of a set of discrete data values. Given a finite set of data points, for example, a periodic sampling taken from a signal, the FFT expresses the data in terms of its component frequencies.

"Pulse train", "train of pulses", "pulse string" or "string of pulses" means a series of pulses having similar characteristics.

"Fixed duration excitation signal" means a series of cycles at a frequency that continues for a fixed period of time.

DETAILED DESCRIPTION OF THE INVENTION

Figure 1:
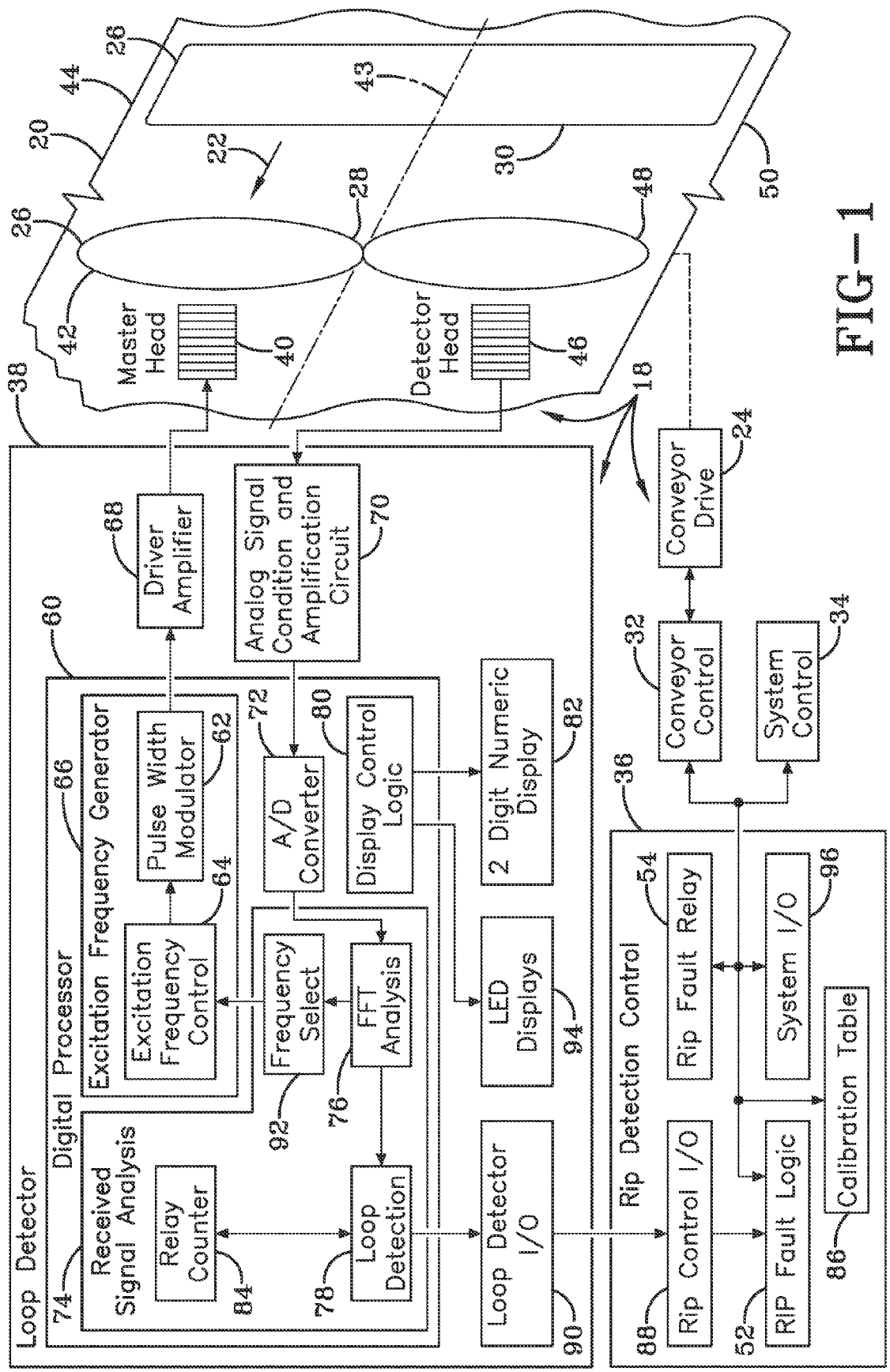
FIG. 1 is a schematic block diagram of one embodiment of a rip detection system in accordance with the principles of the present invention.

Referring to FIG. 1, an exemplary embodiment of a rip detection system 18 is applied to a conveyor belt 20 that is moved in a direction indicated by the arrow 22 by a conveyor drive 24 in a known manner. A series of sensor loops 26 are supported by the conveyor belt 20. The sensor loops 26 extend transversely across the conveyor belt 20 and are spaced apart over a length of the conveyor belt. The sensor loops 26 can be made of one or more conductors and have different configurations, for example, an inverted or figure eight configuration 28 or a loop configuration 30. The exact spacing between the sensor loops 26 depends on the type of conveyor belt 20 and its intended application. The conveyor drive 24 contains the necessary pulleys, shafts, motors and other known mechanical and electromechanical components. The conveyor drive 24 is electrically connected to a conveyor control 32 which, in turn, is often in electrical communications with an overall system control 34. In this exemplary embodiment, the conveyor control 32 is electrically connected to a rip detection control 36 that, in turn, is electrically connected to a loop detector 38.

It is known that there is a higher probably of damage to the conveyor belt 20 near a conveyor belt loading station. Therefore, the loop detector 38 is often mounted at a rip detection station that is located downstream of, but near, a conveyor belt load station. The loop detector 38 is positioned such that a master head 40 and a detector head 46 are in close proximity to the conveyor belt 20. In operation, the loop detector 38 provides an RF excitation signal to the master head 40 that radiates or transmits the RF excitation signal toward a first loop end 42 of the sensor loop 26. The first loop end 42 is located between a conveyor belt longitudinal centerline 43 and a longitudinal edge 44. The master head 40 is mounted adjacent a major surface, for example, an upper or lower surface, of the conveyor belt 26 and sufficiently close thereto to induce a current into the loop one end 42 as the conveyor belt 26 is moved past the master head 40. The sensing or detector head 46 is positioned opposite a second loop end 48 of the sensor loop 26 which is located between the centerline 43 and an opposite edge 50 of the conveyor belt 20. The second loop end 48 is inverted with respect to the first loop end 42, thereby forming a figure eight sensor loop 28. The detector head 46 is located close enough to the major surface of the conveyor belt 20 to permit it to receive a corresponding RF signal from the second loop end 48. The corresponding RF signal is created by the current flow in the sensor loop 26 induced by the excitation RF signal transmitted by the master head 40 and electrical noise from one or more sources.

The loop detector 38 is effective to discriminate the received corresponding RF signal from the detector head 46 as being produced by the RF excitation signal from the master head 40 and thus, determine that the sensor loop 26 is intact and undamaged. In the event that the conveyor belt 20 is damaged, slit, ripped, torn, etc. near the sensor loop 26, there is a high probability that the that the sensor loop 26 will also be damaged. If the sensor loop 26 is an open circuit, there is no current flow from the RF excitation signal; and hence, the loop detector 38 detects a damaged or open sensor loop 26. The loop detector 38 provides a defective loop signal to the rip detection control 36 that is operable in one of several known modes.

For example, in a standard time mode, the rip detection control 36 measures a time between a detection of good sensor loops, and the rip fault relay 54 is switched if a time period passes without the detection of a good sensor loop. In a standard distance mode, the rip detection control 36 determines a distance between detecting good sensor loops. In this mode, the rip detection control 36 uses a calibration table 86 that, in a known manner, stores an identity and configuration of each of the sensor loops 26 and their relative location on the conveyor belt 20. The control 36 switches the rip fault relay 54 if the conveyor 20 is moved through a measured distance without the detection of a good sensor loop. In a pattern distance mode, the rip detection control 36 compares individual separations of the sensor loops 26 as stored in the calibration table 86 with their detected separations in determining whether to change the state of the rip fault relay 54. In the above modes, the rip detection control 36 may utilize a position or velocity feedback of the conveyor belt in a known manner.

The above general operation of a rip detection system 18 is known. As previously described, in many applications, the conveyor 20 is located in a mine or industrial environment in which there are large motors and other electrical equipment that generate significant RF energy. Further, the physical presence of that equipment as well as other electrically conductive structures in the proximity of the sensor loops 26 and the master and detector heads 40, 46 interferes with the operation of those devices. More specifically, environmental RF energy may introduce sufficient noise into the sensor loop, which when combined with a capacitive coupling of the master head 40 and detector head 46, may make it impossible for the loop detector 38 to reliably discriminate the source of received signals from the detector head 46. Therefore, in known systems, noise can create sensor loop detection errors, which may result in a ripped conveyor belt not being shut down and experiencing more damage, or a shut down of an undamaged conveyor belt. In either event, the consequences of sensor loop detection errors can be very time consuming and expensive.

Figure 2:
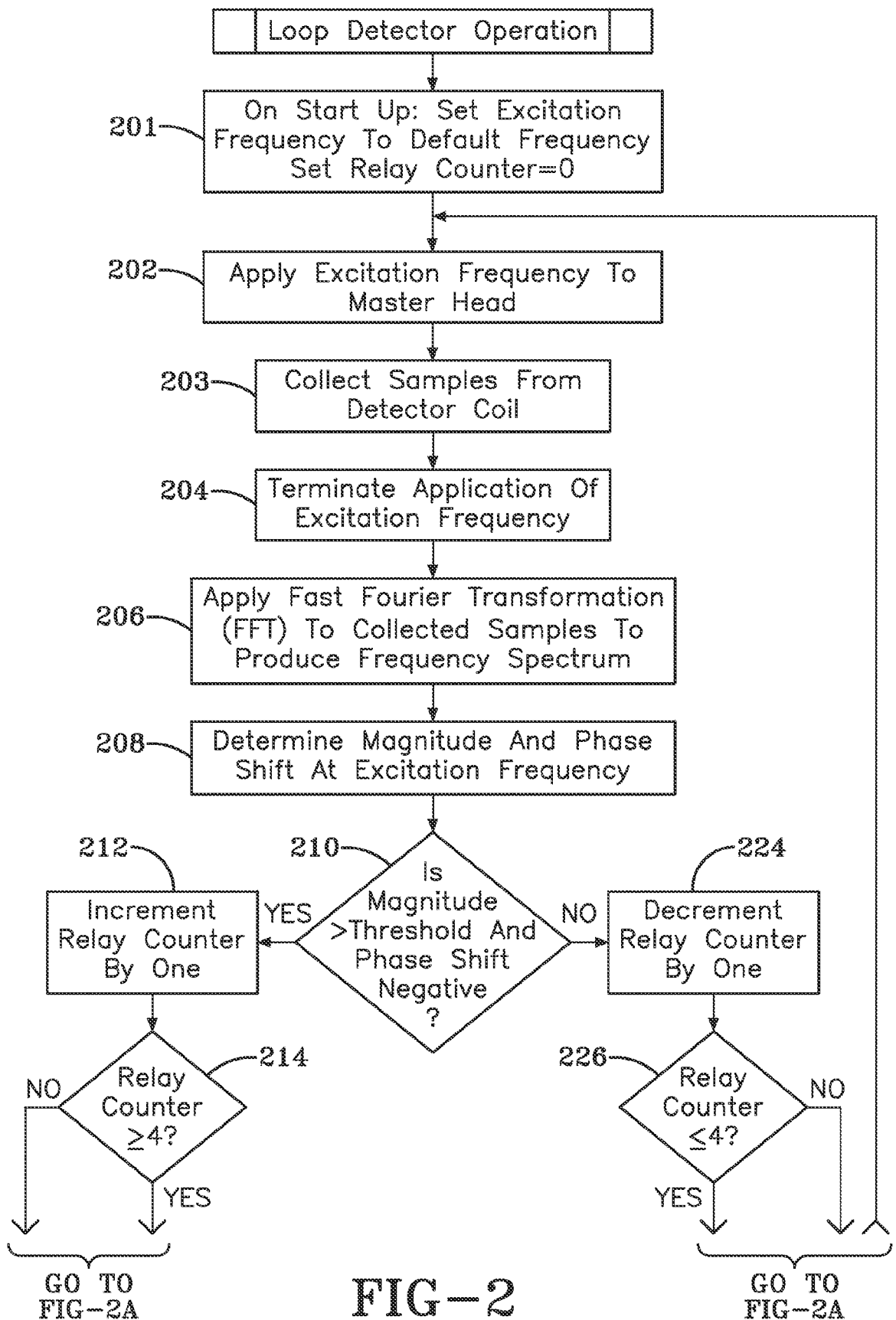
FIGS. 2 and 2A are a schematic flow chart depicting an operation of the rip detection system of FIG. 1.
Figure 2A:
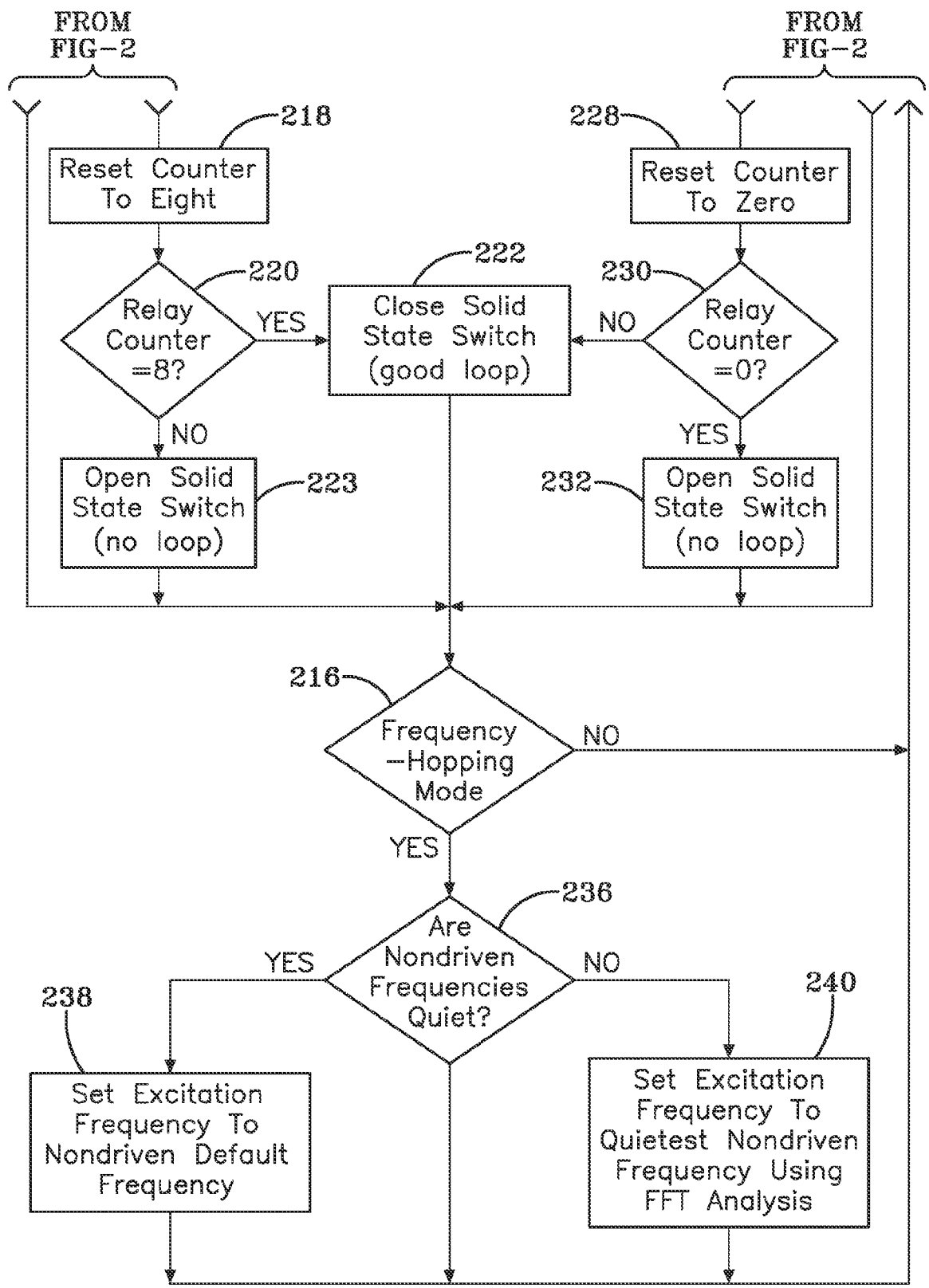

In an effort to improve the quality and reliability of conveyor belt rip detection, the loop detector 38 utilizes a digital processor 60 that provides a substantially improved capability of operating a rip detection system in an electrically noisy environment. The digital processor 60 can be implemented using known digital signal processors, programmable integrated circuits and/or programmable controllers designed for high-speed data manipulation in applications requiring the control and processing of analog signals, for example, a TMS320LF series controller commercially available from Texas Instruments of Dallas, Tex. While digital signal processors are often integrated circuit chips that have different functions integrated therein, the digital processor 60 can be implemented with nonintegrated programmable memory digital processors and/or programmable memory controllers that provide substantially similar functions as those described herein. An exemplary operation of the loop detector 38 is shown in FIGS. 2 and 2A. In this exemplary embodiment, as the conveyor belt 20 sensor loop 26 are moved past the master and detector heads 40, 46, the loop detector 38 continuously iterates or cycles. With each iteration, a fixed duration pulse string at the excitation frequency is applied to the sensor loop 26 and a received signal is sensed and qualitatively analyzed. In this exemplary embodiment, the qualitative states detected are "loop present" or "loop not present" states. The loop detector 38 must detect four consecutive loop present signals in order for the loop detector 38 to pass a "good loop" qualitative state signal on to the rip detection control 36. Further, once a good loop signal is generated, four consecutive loop not present signals must be detected in order for the loop detector 39 to pass a "no loop" qualitative state signal to the rip detection control 36 indicating a broken or open loop and a damaged conveyor belt. The rip fault logic 52 determines how to interpret the no loop signal, that is, whether a particular no loop signal triggers a shut down of the conveyor belt 20.

In this exemplary embodiment, the loop detector has two modes of operation, a single frequency mode and a frequency-hopping mode in which the excitation frequency automatically changes. The operation of the loop detector 38 will first be described with respect to the single frequency mode. Referring to FIG. 2, in the single frequency mode, the digital processor 60, first, at 201, sets a default excitation frequency of about 50 kHz and sets a relay counter 84 to zero. The digital processor 60 includes hardware and programmable software to provide several processor functions, for example, a pulse width modulator 62 and an excitation frequency control 64 that together function as a excitation frequency generator 66. The digital processor 60 further contains necessary hardware and memory storing programmable instructions to provide an analog/digital ("A/D") converter 72, an FFT analyzer 76, loop detection logic 78, the relay counter 84 and a frequency selector 92.

The excitation frequency generator 66, at 202, produces an excitation signal in the form of a fixed duration string of pulses of a desired frequency to a driver amplifier 68 that, in turn, is connected to the master head 40. Even though generally square waves are provided from the pulse width modulator 62, the complex impedance of the circuit that includes the driver amplifier 68 and the master head 40 results in a drive signal that is periodic and follows the frequency of the pulse width modulator but is not a square wave. Assuming a presence of an unbroken sensor loop 26, a current is induced in the sensor loop 26; and a corresponding received signal is detected by the detector head 46 and provided to an analog signal condition and amplification circuit 70. The analog signal condition and amplification circuit 70 clips the corresponding received signal, so that approaches a square wave; however, in alternative embodiments, such clipping need not be performed nor is it required. The loop detector 38 waits a small period of time after supplying the excitation pulses; and then, the A/D converter 72, at 203, stores samples of the corresponding received signal provided from the analog signal conditioning circuit 70. The number of samples stored is consistent with signal sampling practices and may be hundreds or more. The output string of pulses created by the excitation frequency generator 66 is provided over a fixed duration that is sufficient long to permit the sampling process to be executed. Upon the expiration of the fixed duration of the output string of pulses, their application to the master head 40 is terminated at 204. Thus, no further excitation signal is applied to the master head 40 during further processing of the received signal in this iteration of the loop detector 38. The FFT analyzer 76 performs, at 206, a Fourier transform on the digital stored samples of the received signal from the A/D converter 72 and provides a spectrum of the component frequencies contained within the received signal. Thereafter, loop detection logic 78 determines, at 208, magnitude and phase values of the current excitation frequency in the frequency spectrum.

The magnitude analysis is used to provide first, a general determination of the quality of signal coupling of the heads 40, 46 with the sensor loop 26 and secondly, to identify the quality of the received signal with respect to a general noise level. A received signal magnitude value is displayed as a two digit number in a numeric display 82. The number is a normalized number in which a maximum value of 99 represents a signal magnitude that would be expected if the master and detector heads 40, 46 were in direct contact with the conveyor belt 20 and centered inside the respective loop ends 42, 48. A zero value represents an absence of a sensor loop or the presence of a broken sensor loop 26; and hence, no conductive sensor loop present. As the master and detector heads 40, 46 are moved away from the belt, their electrical coupling with the sensor loop 26 changes. Thus, a normalized magnitude value will depend on how far the master detector heads 40, 46 are mounted from the conveyor belt 20 in any particular application. Generally, higher normalized magnitude values represent a stronger electromagnetic coupling between the master and detector heads 40, 46 and the sensor loop 26.

The received signal analyzer 74 performs a second magnitude analysis of the received signal. In this exemplary embodiment, it is assumed that any normalized magnitude value displayed by the numeric display 82 that is 15 or less is attributable to noise in the loop detection system 18. Therefore, in the different modes of operation described herein, a received signal magnitude having a normalized value of 15 or less is identified as noise and is not considered to be a signal corresponding to an excitation signal. Arbitrarily discarding a received signal as noise, which has a normalized magnitude of 15 or less, is an attempt to reduce the adverse impact of noise on the loop detector operation. Further, the normalized value of 15 is not an absolute value, but is an adjustable value that can be changed with each application and installation.

The received signal analyzer 74 further has loop detection logic 78 that examines the frequency spectrum provided by the FFT analyzer 76 and determines a phase of the current excitation signal frequency within the frequency spectrum. In view of the inductive nature of the heads 40, 46 and the inverted, figure eight loop 28, it can be expected that a received signal will have a negative phase shift with respect to the excitation signal frequency. However, if the sensor loop 26 is a noninverted loop 30, a different phase shift can be predicted and detected. Therefore, as shown at 210 of FIG. 2, loop detection logic 78 determines whether the normalized magnitude value of the received signal within the frequency spectrum produced by the FFT analyzer 78 is above 15 and secondly, whether the received signal phase shift is negative. If so, the loop detection logic 78 identifies the received signal as indicating a presence of a sensor loop and increments, at 212, a relay counter 84 by one.

Next, at 214, the digital processor 60 determines whether the relay counter 84 is greater than or equal to 4. If not, the processor 60 then determines, at 216, whether a frequency-hopping mode has been selected. If not, the digital processor returns to step 202 and again applies an excitation frequency pulse string to the master head 40. The process described above with respect to steps 202 through 216 is repeated a number of times, and each time the magnitude and phase of the excitation signal frequency within the frequency spectrum from the FFT analyzer 76 is detected to determine whether or not the loop 26 is present. If four consecutive iterations result in four detections of the sensor loop 26 being present, the loop detection logic 74, at 214, detects the relay counter 84 being equal to four, and at 218, sets the relay counter 84 to a value of eight. Next, at 220 of FIG. 2A, the loop detection logic detects the relay counter 84 being eight, and at 222, sets an output on a loop detector I/O 90 to a state representing a good sensor loop 26. That state is provided by rip control I/O 88 to the rip fault logic 52 that, in a known manner, maintains a rip fault relay 54 in a state that causes the conveyor control 32 to continue operation of the conveyor belt 20 in accordance with the control logic of the rip detection system 36. The loop detector I/O 90 and rip detector I/O 88 function in a known manner to provide and receive analog signals, digital signal states as well as signals over a serial communication link.

In contrast to a good loop detection, the loop detector 38 may also detect a "no loop" condition. Assume a good loop has already been detected, and the relay counter 84 has been set to eight. If at 210, the normalized magnitude of the received signal is not greater than 15, or the phase shift is not detected to be negative, the loop detection logic 78, at 224, provides a "loop not present" signal that decrements the relay counter 84 by 1. The loop detection logic 78 then, at 226, determines the relay counter 84 is less than or equal to 4, and at this point, the relay counter 84 is not equal to four. The digital processor 60 now returns to step 202 and again applies a fixed duration excitation pulse string having the same frequency to the master head 40. The sampling and FFT processes are repeated; and the loop detection logic again, at 210, determines whether the phase and magnitude of the received signal indicate whether a loop is present. The relay counter 84 is incremented or decremented accordingly, and the process continues to iterate until a relay counter value of four is detected.

It should be noted that the sensor loops 26 are separated on the conveyor belt 20 by many feet, for example, up to 100 feet; and further, the width of a sensor loop end is generally a little more than one foot. Therefore, while portions of the conveyor belt between the sensor loops 26 are moving past the master and detector heads 40, 46, loop not present signals will be detected. Upon four consecutive loop not present signals decrementing the relay counter to a value of 4, referring to FIG. 2A, the loop detection logic, at 228, resets the relay counter to zero. Thereafter, the loop detection logic 78, at 230, detects a zero state of the relay counter 84 and at 232, causes the I/O 90 to present a no loop output signal state to the rip fault logic 52 via the rip control I/O 88, which represents an absence of, or a damaged, sensor loop 26.

In response to a no loop input state, the rip detection control 36 operates with the conveyor control 32 in known manner to control operation of the conveyor drive 24 and belt 20 depending on a known mode of operation, for example, a time mode, a distance mode or a pattern mode. In this exemplary embodiment, the rip detection control 36 also includes system I/O 96 that is effective to communicate sensor loop data to another display, computer or control.

In addition to a single frequency mode of operation, the loop detector 38 is operable in a frequency-hopping mode of operation. A bandwidth between about 45-53 kHz is divided into ten frequencies. In general, in the frequency-hopping mode of operation, with the application of each excitation pulse string, a normalized magnitude value is determined for each of the ten frequencies in the FFT frequency spectrum; and the frequency having the lowest normalized magnitude value is used as the next excitation frequency. The loop control is switchable from the single frequency mode to the frequency-hopping mode by a hardware setting in the loop detector 38.

Further, in both operating modes, the loop detector 38 illuminates an LED of LED displays 94 upon detecting that any of the nonexcitation frequencies are noisy, that is, have a normalized magnitude value of greater than 15. Thus, the user is provided an indication that noise is present. The LED displays 94 include other LEDs that are used to indicate whether a sensor loop is present and whether the digital processor is powered. In addition, there is an LED for each excitation frequency that illuminates when that particular frequency is used, and other LEDs may be used to identify other operating states as well as diagnostic and test states.

More specifically, when in the frequency-hopping mode as shown at 201 in FIG. 2, on start up, the digital processor 60 sets an excitation frequency to a default frequency. In the frequency-hopping mode, a first default frequency is about a 50.8 kHz; and as described earlier with respect to process steps 202-232, the excitation frequency generator 66 applies a fixed duration excitation pulse string at the first default frequency to the master head of 40. The received signal analyzer 74 provides a frequency spectrum based on an FFT analysis of a corresponding received signal sensed by the detector head 46. At 210, the loop detection logic 78 determines whether the frequency spectrum at the excitation frequency has a normalized magnitude value of more than 15 and a negative phase shift corresponding to a good sensor loop 26; and the relay counter is incremented as earlier described. In the frequency-hopping mode as detected at 216, prior to applying a subsequent string of pulses to the master head 40, the digital processor 60 has a frequency selector 92 that selects a different excitation frequency as shown in FIG. 2A.

In the frequency-hopping mode, the loop detector 38 has a second default frequency of about 48 kHz. The first default frequency is the current excitation frequency, and thus, the second default frequency is currently a nonexcitation second default frequency. The frequency selector 92 determines, at 236, whether the nonexcitation frequencies are quiet, that is, whether the largest normalized magnitude value of a nonexcitation frequency is less than 15. If so, the frequency selector 92 then, at 238, sets the excitation frequency to the second default frequency; and the excitation frequency generator 66 then, at 202, applies to the master head 40 a fixed duration excitation pulse string having the second default frequency. The loop detector 38 again executes process steps of 203-236 as previously described. If, at 236, the loop detector 38 again detects that the nonexcitation frequencies are quiet, the frequency selector 92, at 238, sets the excitation frequency to the first default frequency. Thus, in the frequency-hopping mode, if the nonexcitation frequencies are determined to be quiet, that is, no normalized magnitude value is 15 or more, the excitation frequency toggles or hops between the two default frequencies with successive excitation cycles. In this mode of operation, not only is a loop presence tested with an application of an excitation signal; but also, noise is examined in all of the nonexcitation frequencies. Further, by toggling between two default frequencies, the amplitude of ambient noise for all frequencies is determined every other excitation cycle. Instead of frequency hopping with each iteration of the loop detector 38, in an alternative embodiment, a timer may be used to determine when the frequency is changed to detect ambient noise amplitudes of the nonexcitation frequencies. Using default frequencies causes LEDs associated with those frequencies to illuminate relatively constantly, thereby permitting an operator easily and quickly tell if the system is operating in a less noisy environment.

If, at 236, the frequency selector logic 92 determines that the nonexcitation default frequency is not quiet, that is, if it has a normalized magnitude value of greater than 15, the frequency select logic 92 then, at 240, looks at the normalized magnitude values of the other 9 frequencies. The excitation frequency having the lowest normalized magnitude value is then selected as the next excitation frequency. And at 202, the excitation frequency generator 66 applies an excitation pulse string having that quietest excitation frequency to the master head 40. Thus, in the frequency-hopping mode, with each cycle or iteration of the loop detector 38 through the process of FIGS. 2 and 2A, if any nonexcitation frequency is determined to have noise amplitude that is greater than 15, the frequency selector 92 is operable to choose an excitation frequency having the lowest noise amplitude. By continuously exciting the master head 40 with an excitation frequency that has a lowest noise amplitude, the loop detector 38 provides a more reliable detection of whether a loop is present or not present. Such an improved reliability not only reduces unwarranted conveyor shut downs but also results in more accurate shut downs of the conveyor to minimize conveyor belt damage in the event of no loop determinations when loops are damaged.

The loop detector 38 shown and described herein provides numerous advantages and has substantially improved performance and in noisy environments. First, the master head 40 is excited with a fixed duration string of pulses that is terminated after a corresponding received signal has been sampled and stored. Terminating the application of the excitation pulses and also varying excitation signal frequencies reduces an inherent capacitive cross-coupling that generates noise. Second, with successive iterations or cycles, in a noisy environment, the loop detector 38 can choose excitation frequencies that have the lowest noise amplitudes, which substantially improves noise immunity of the loop detector 38. Third, using the digital processor 60, the loop detector 38 has a greater read range with respect to the sensor loop 26 than prior analog circuits. This greater read range produces generally higher normalized magnitude values and often respectively higher signal-to-noise ratios. The loop detector 38 has the further advantage of being able to detect a figure eight loop 28 as well as a noninverted loop 30. Also, the loop detector 38 does not use a large capacitance automatic gain control circuit, thereby eliminating the costly requirements of providing associated electrical shielding and filtering.

While the present invention has been illustrated by a description of various embodiments and while these embodiments have been described in considerable detail, it is not the intention of Applicants to restrict or in any way limit the scope of the appended claims to such detail. Additional advantages and modifications will readily appear to those skilled in the art. For example, in the described embodiments, the normalized magnitude value is used to test for the presence of ambient noise in nonexcitation frequencies during the operation of the loop detector 38. However, the two digit display 82 may also be used during an adjustment of the master and detector heads 40, 46. While the positions of the heads 40, 46 are being adjusted, the conveyor and loop detector are operated, and the normalized magnitude value in the display 82 is observed. The heads 40, 46 are located at positions providing the highest normalized magnitude values and thus, the strongest electromagnetic coupling between the master and detector heads 40, 46 and the sensor loop 26.

In the described embodiments, the normalized magnitude value is used to determine a sensor loop qualitative state of being present. However, in an alternative embodiment, the normalized magnitude value may be used to determine other sensor loop or conveyor belt qualitative states. For example, after the heads 40, 46 have been adjusted, the conveyor belt and loop detector can be operated; and normalized magnitude values stored in association with a respective sensor loop. Such normalized magnitude values may be stored, for example, in the calibration table 86 of the rip detection control 36. In the iterative process of the loop detector 38, a stored normalized magnitude value may be an average of normalized magnitude values for a particular loop. After one revolution of the conveyor belt 20, a map of initial or reference normalized magnitude values for all of the sensor loops 26 on the conveyor belt will be stored. With continued operation of the conveyor belt, current normalized magnitude values for the sensor loops may be determined and stored to provide a map of current normalized magnitude values. As a sensor loop or the conveyor belt around the sensor loop experiences changes in its physical characteristics from normal wear or an unexpected force or damage. For example, if one or more conductors in a sensor loops are damaged or broken, an impedance of the sensor loop will change. Such an impedance change will change current flow in the sensor loop and hence, the normalized magnitude value produced during an excitation signal.

Therefore, at any time, a map of the current normalized magnitude values of each of the sensors can be compared to the initial or reference map of the normalized magnitude values and a determination made with respect to a qualitative characteristic of a respective sensor loop and/or conveyor belt. In addition, the rip detection control 36 also often tracks failures to detect loops and other data. The above data can be analyzed by a user printing the initial and current maps and other data for purposes of analysis. In other embodiments, the normalized magnitude values may be automatically compared on a sensor loop by sensor loop basis by the rip detection control 36 or other control; and a magnitude of change, a rate of change, or other change in the normalized magnitude values determined. Thus, under some circumstances, a deterioration or other qualitative change in the sensor loop 26 and possibly the conveyor belt 20 can be observed by tracking the normalized magnitude values over a period of time. An output may then be provided based of those changes and other data available to the rip detection control 36. The output can range from a simple warning light to a display of an identity of a sensor loop of concern; and in other embodiments, the operation of the conveyor belt may automatically be altered or stopped in a controlled manner.

Further, in the described embodiments, the excitation signal is a fixed duration excitation signal that is terminated after a corresponding received signal has been sampled and stored. While it is believed that such a fixed duration excitation signal reduces noise in the loop detection process, in an alternative embodiment, an excitation signal may be continuously applied to the master head 40; and the loop detector 38 will operate as described herein with respect to FIGS. 1, 2 and 2A. However, in this alternative embodiment, there may be noisier environments where the quality of the loop detection may be less reliable than if a fixed duration excitation signal were used.

In the described embodiment, the loop detection logic 78 requires four loop present or loop not present detections to occur before a respective good loop or no loop signal is sent to the loop detector I/O 90. This is done to filter false detections from the system that may be the result of noise or other spurious events. However, the requirement of four loop present or loop not present signals can be different; and depending on the application, in other embodiments, good loop and no loop signals may be generated in response to a number of respective loop present or loop not present signals that is less than four or more than four.

In the frequency-hopping mode, a bandwidth of frequencies between about 45-53 kHz is divided into ten frequencies. Thus, each of the ten frequencies has a separation of less than one kHz. The total bandwidth spanning the ten frequencies, the bandwidth separating the frequencies and the number of frequencies are not considered important to practicing the claimed invention. However, utilizing excitation frequencies generally around 50 kHz is considered to provide better performance; and in alternative embodiments, more or less than ten frequencies that are separated by fixed or different bandwidths may be used.

Therefore, the invention in its broadest aspects is not limited to the specific details shown and described. Consequently, departures may be made from the details described herein without departing from the spirit and scope of the claims which follow.

What is claimed is:

1. An apparatus for use in a conveyor belt rip detector that couples excitation signals to sensor loops carried by a conveyor belt and thereafter, detects corresponding received signals from respective sensor loops, the apparatus comprising:
   an excitation frequency generator generating excitation signals at a first frequency, the excitation signals adapted to be transmitted to the sensor loops,
   an analog-to-digital converter adapted to detect corresponding received signals from the sensor loops,
   a fast Fourier transform analyzer adapted to perform fast Fourier transforms on the corresponding received signals to provide respective signal frequency spectrums, and
   loop state logic determining magnitude and phase values for the first frequency in the respective received signal frequency spectrums and determining loop present and loop not present states of the sensor loops in response to determining the magnitude and phase values.

2. An apparatus for use in a conveyor belt rip detector that couples excitation signals to sensor loops carried by a conveyor belt and thereafter, detects corresponding received signals from respective sensor loops, the apparatus comprising:
   an excitation frequency generator generating excitation signals having a fixed duration and a first frequency, the excitation signals adapted to be transmitted to a sensor loop,
   an analog-to-digital converter adapted to detect corresponding received signals from the sensor loop, and
   a received signal analyzer adapted to determine for the corresponding received signals first, magnitude and phase values at the first frequency and second, one of a loop present and loop not present state of the sensor loop in response to determining the magnitude and phase values, the fixed duration terminating generation of the excitation signals prior to a determination of the magnitude and phase values to reduce an inherent capacitive cross-coupling that generates noise.

3. The apparatus of claim 2 wherein the excitation signals comprise respective pulse strings.

4. The apparatus of claim 2 wherein the excitation frequency generator further provides each successive excitation signal at a frequency different from a frequency of an immediately preceding excitation signal.

5. The apparatus of claim 2 wherein the received signal analyzer comprises:
   a fast Fourier transform analyzer performing a fast Fourier transform of the corresponding received signal to provide respective a received signal frequency spectrum; and
   loop state logic determining a qualitative state of the sensor loop.

6. The apparatus of claim 2 wherein the received signal analyzer comprises a frequency selector to select a different frequency for each successive excitation signal.

7. The apparatus of claim 2 wherein the excitation frequency generator comprises:
   an excitation frequency control responsive to the received signal analyzer; and a pulse width modulator responsive to the excitation frequency control for producing excitation signal pulse strings of a desired frequency.

8. The apparatus of claim 2 further comprising master and detector heads for coupling the excitation signals to the sensor loops and the magnitude value comprises a normalized magnitude value having a maximum value representing a signal magnitude that would be expected if the master and detector heads were in direct contact with the conveyor belt inside the sensor loop and a minimum value representing an absence of a sensor loop or the presence of a broken sensor loop.

9. A conveyor bet rip detection system for detecting damage to moving conveyor belt comprising:
   a conveyor system having a conveyor belt and associated drive operatively connected to the conveyor belt:
   conductive sensor loops adapted to be placed along a length of the conveyor belt;
   a digital excitation frequency generator providing excitation signals at a frequency and having a fixed duration:
   a master head transmitting the excitation signals to the conductive sensor loops;
   a detector head providing received signals in response to detecting currents in the conductive sensor loops corresponding to respective excitation signals; and
   a digital received signal analyzer analyzing received signals after expiration of the fixed duration of respective excitation signals to provide signal states representing loop present and loop not present states of the conductive senor sensor loops.

10. The apparatus of claim 9 wherein the conductive sensor loops comprise inverted sensor loops and noninverted sensor loops.

11. The apparatus of claim 10 wherein the digital received signal analyzer performs a fast Fourier transform on the received signals to provide respective received signal frequency spectrums.

12. The apparatus of claim 11 wherein the digital received signal analyzer determines a magnitude value and a phase value for each received signal at the frequency in a respective received signal frequency spectrum.

13. The apparatus of claim 12 wherein the digital excitation frequency generator provides each successive excitation signal at a frequency different from a frequency of an immediately preceding excitation signal.

14. A method of determining a qualitative state of a conveyor belt comprising:
    applying a first excitation signal having a first frequency to a first sensor loop carried by a conveyor belt;
    detecting a first received signal from the first sensor loop corresponding to the first excitation signal;
    performing a fast Fourier transform on the first received signal to provide a first received signal frequency spectrum;
    identifying magnitude and phase values at the first frequency in the respective received signal frequency spectrum; and
    determining a qualitative state of the first sensor loop in response to the magnitude and phase values.

15. The method of claim 14 further comprising iterating with respect to the first sensor loop the steps of applying, detecting, performing, identifying and determining using a second excitation signal having a second frequency different from the first frequency.

16. The method of claim 14 further comprising:
    identifying a second frequency in the first received signal frequency spectrum having a noise amplitude less than a noise amplitude of the first frequency; and
    iterating with respect to the first sensor loop the steps of applying, detecting, performing, identifying and determining using a second excitation signal having the second frequency.

17. The method of claim 14 further comprising:
    identifying a second frequency in a group of more than two frequencies in the first received signal frequency spectrum having a lowest noise amplitude; and
    iterating with respect to the first sensor loop the steps of applying, detecting, performing, identifying and determining using a second excitation signal having the second frequency.

18. The method of claim 14 further comprising after detecting the corresponding first received signal, terminating an application of the first excitation signal to the sensor loop.

19. A method of determining a qualitative state of a conveyor belt comprising:
    applying a first fixed duration excitation signal having a first frequency to a first sensor loop carried by a conveyor belt;
    detecting a corresponding first received signal from the first sensor loop;
    after expiration of the fixed duration; generating magnitude and phase values for the corresponding first received signal; and
    determining a qualitative state of the first sensor loop in response to the magnitude and phase values.

20. The method of claim 19 further comprises applying successive fixed duration excitation signals at different frequencies.

21. The method of claim 19 wherein generating magnitude and phase values further comprises:
    performing a fast Fourier transform on the corresponding first received signal to provide a first received signal spectrum; and
    determining a phase of the first received signal at the first frequency in the first received signal spectrum.

22. The method of claim 21 wherein generating magnitude and phase values further comprises:
    determining noise magnitudes of the first received signal at respective frequencies in the first received signal spectrum different from the first frequency; and
    selecting a frequency having a least noise magnitude as a successive excitation signal.

23. A method of determining a qualitative state of a conveyor belt comprising:
    applying a first excitation signal having a first frequency to a first sensor loop carried by a conveyor belt;
    detecting a corresponding first received signal from the first sensor loop;

generating magnitude and phase values for the corresponding first received signal;
determining a qualitative state of the first sensor loop in response to the magnitude and phase values;
selecting a second frequency having a noise magnitude less than a noise magnitude of the first frequency; and
applying a second excitation signal having the second frequency to the first sensor loop, wherein the first excitation signal has a fixed duration and the method further comprises allowing the fixed duration of the first excitation signal to expire prior to generating magnitude and phase values for the corresponding first received signal.

* * * * *